US007806949B2

(12) United States Patent
DiPrizio et al.

(10) Patent No.: US 7,806,949 B2
(45) Date of Patent: Oct. 5, 2010

(54) LOW-PROFILE SURFACE MOUNT FILTER (75) Inventors: Anthony C. DiPrizio, Brookline, NH (US); Nathan Abbott, Rindge, NH (US); Christopher Vroman, Shrewsbury, MA (US); Rajnikant B. Patel, Tewksbury, MA (US); Eric McNamara, Nashua, NH (US)

(73) Assignee: Entegris, Inc., Billerica, MA (US)

( * ) Notice: Subject to any disclaimer, the term of this patent is extended or adjusted under 35 U.S.C. 154(b) by 0 days.

(21) Appl. No.: 12/509,970

(22) Filed: Jul. 27, 2009

(65) Prior Publication Data
US 2009/0282979 A1 Nov. 19, 2009

Related U.S. Application Data

(62) Division of application No. 11/353,294, filed on Feb. 10, 2006, now Pat. No. 7,575,616.

(51) Int. Cl.
*B01D 39/00* (2006.01)
(52) U.S. Cl. .......................... 55/309; 55/490; 55/385.1; 55/482; 55/484; 55/498; 55/495; 55/522; 55/529; 55/523; 55/485; 96/197; 95/273; 95/267; 95/268; 137/884
(58) Field of Classification Search ................. 55/385.1, 55/482, 484–485, 495, 498, 522, 523, 529, 55/490, 309; 95/273; 137/884
See application file for complete search history.

(56) References Cited

U.S. PATENT DOCUMENTS 2,528,557 A    11/1950   Shapiro (Continued)

FOREIGN PATENT DOCUMENTS

EP            0791670 A2    8/1997

(Continued)

OTHER PUBLICATIONS

International Search Report and Written Opinion mailed Feb. 22, 2008 issued in International Patent Application No. PCT/US07/03628.

(Continued)

*Primary Examiner*—Jason M Greene
*Assistant Examiner*—Dung Bui
(74) *Attorney, Agent, or Firm*—Sprinkle IP Law Group (57) ABSTRACT

Embodiments of the present invention provide low-profile surface mount filters. One embodiment of the present invention includes a filter housing adapted to mount on a substrate block having a plurality of flow paths and a filter cavity defined therein. The filter cavity is defined to extend in a generally horizontal direction when the low-profile filter is in use. A first flow passage is defined to connect an inlet of the filter housing to a first section of the filter cavity and a second flow passage is defined to connect a second section of the filter cavity to an outlet of the filter housing. A filter assembly is disposed in the filter cavity and sealed to the surface of the filter cavity separating the filter cavity into adjacent sections including the first section of the filter cavity and second section of the filter cavity.

9 Claims, 7 Drawing Sheets

U.S. PATENT DOCUMENTS

| | | | |
|---|---|---|---|
| 3,516,436 A | 6/1970 | Klaus et al. | |
| 3,589,387 A | 6/1971 | Raymond | |
| 3,654,960 A | 4/1972 | Klernan | |
| 3,834,417 A * | 9/1974 | Holben et al. | 137/613 |
| 4,384,474 A | 5/1983 | Kowalski | |
| 4,784,880 A | 11/1988 | Coplan et al. | |
| 5,163,475 A | 11/1992 | Gregoire | |
| 5,303,731 A * | 4/1994 | Vavra et al. | 137/468 |
| 5,333,637 A | 8/1994 | Gravel | |
| 5,423,228 A | 6/1995 | Budd et al. | |
| 5,468,384 A | 11/1995 | Garcera | |
| 5,490,397 A | 2/1996 | Kitamura et al. | |
| 5,605,179 A | 2/1997 | Strong, Jr. et al. | |
| 5,617,898 A | 4/1997 | Nagai et al. | |
| 5,684,245 A | 11/1997 | Hinkle | |
| 5,730,181 A * | 3/1998 | Doyle et al. | 137/487.5 |
| 5,732,744 A | 3/1998 | Barr et al. | |
| 5,769,110 A * | 6/1998 | Ohmi et al. | 137/269 |
| 5,810,031 A | 9/1998 | Evans et al. | |
| 5,819,782 A * | 10/1998 | Itafuji | 137/240 |
| 5,836,355 A | 11/1998 | Markulec et al. | |
| 5,908,553 A | 6/1999 | Reid | |
| 5,964,481 A | 10/1999 | Buch | |
| 5,992,463 A | 11/1999 | Redemann et al. | |
| 6,012,479 A | 1/2000 | Fukushima et al. | |
| 6,035,609 A | 3/2000 | Evans et al. | |
| 6,068,016 A | 5/2000 | Manofsky et al. | |
| 6,078,030 A | 6/2000 | Moon | |
| 6,123,107 A | 9/2000 | Selser et al. | |
| 6,123,340 A | 9/2000 | Sprafka et al. | |
| 6,149,718 A | 11/2000 | Cowan et al. | |
| 6,155,289 A * | 12/2000 | Carlsen et al. | 137/457 |
| 6,158,454 A | 12/2000 | Duret et al. | |
| 6,186,177 B1 * | 2/2001 | Maher | 137/884 |
| 6,189,570 B1 | 2/2001 | Redemann et al. | |
| 6,227,248 B1 | 5/2001 | Miyazoe | |
| 6,234,455 B1 | 5/2001 | Wittek | |
| 6,260,581 B1 | 7/2001 | Hollingshead | |
| 6,273,139 B1 | 8/2001 | Ohmi et al. | |
| 6,283,155 B1 | 9/2001 | Vu | |
| 6,293,310 B1 | 9/2001 | Redemann et al. | |
| 6,298,881 B1 | 10/2001 | Curran et al. | |
| 6,349,744 B1 * | 2/2002 | Grosshart | 137/884 |
| 6,374,859 B1 | 4/2002 | Vu et al. | |
| 6,382,238 B2 | 5/2002 | Ishii et al. | |
| 6,394,138 B1 * | 5/2002 | Vu et al. | 137/884 |
| 6,514,323 B1 * | 2/2003 | Palermo et al. | 95/273 |
| 6,546,960 B1 | 4/2003 | Rohrberg et al. | |
| 6,615,870 B2 | 9/2003 | Tsourides | |
| 6,659,131 B2 | 12/2003 | Tsourides | |
| 6,729,353 B2 | 5/2004 | Nguyen | |
| 6,868,867 B2 * | 3/2005 | Yamaji et al. | 137/884 |
| 6,886,599 B2 * | 5/2005 | Ichikawa et al. | 137/884 |
| 7,004,199 B1 | 2/2006 | Funes et al. | |
| 7,017,609 B2 * | 3/2006 | Miwa | 137/884 |
| 7,055,550 B2 | 6/2006 | Harris et al. | |
| 7,152,629 B2 | 12/2006 | Tokuda et al. | |
| 7,320,339 B2 | 1/2008 | Milburn | |
| 7,334,605 B2 | 2/2008 | Vu | |
| 7,370,674 B2 | 5/2008 | Doyle | |
| 7,410,519 B1 | 8/2008 | Ewald | |
| 7,418,978 B2 | 9/2008 | Chao et al. | |
| 7,458,397 B2 | 12/2008 | Doyle | |
| 7,484,527 B2 | 2/2009 | Tamaki et al. | |
| 2001/0003287 A1 | 6/2001 | Ohmi et al. | |
| 2001/0013371 A1 | 8/2001 | Redemann et al. | |
| 2002/0011113 A1 | 1/2002 | Tsourides | |
| 2002/0017329 A1 | 2/2002 | Fukushima | |
| 2002/0033195 A1 | 3/2002 | Fujimoto et al. | |
| 2002/0038672 A1 | 4/2002 | Tsourides | |
| 2002/0038673 A1 * | 4/2002 | Tsourides | 137/884 |
| 2002/0050299 A1 | 5/2002 | Nguyen | |
| 2002/0053403 A1 | 5/2002 | Tsourides | |
| 2002/0117221 A1 | 8/2002 | Ushizawa et al. | |
| 2002/0185185 A1 | 12/2002 | Yamaji et al. | |
| 2002/0195165 A1 * | 12/2002 | Vu | 141/98 |
| 2003/0041910 A1 | 3/2003 | Morokoshi et al. | |
| 2003/0106597 A1 * | 6/2003 | Ichikawa et al. | 137/884 |
| 2003/0116207 A1 * | 6/2003 | Symington | 137/884 |
| 2004/0035480 A1 * | 2/2004 | Tsourides | 137/884 |
| 2004/0129324 A1 | 7/2004 | Vu | |
| 2004/0143404 A1 * | 7/2004 | Barros et al. | 702/50 |
| 2004/0168732 A1 | 9/2004 | Perusek et al. | |
| 2004/0173270 A1 | 9/2004 | Harris et al. | |
| 2005/0005981 A1 | 1/2005 | Eldsmore et al. | |
| 2005/0061377 A1 | 3/2005 | Otsuki et al. | |
| 2005/0072481 A1 | 4/2005 | Hanada et al. | |
| 2005/0224121 A1 | 10/2005 | Milburn et al. | |
| 2005/0229972 A1 | 10/2005 | Hoshi et al. | |
| 2005/0284528 A1 | 12/2005 | Chao et al. | |
| 2005/0284529 A1 | 12/2005 | Iwabuchi | |
| 2006/0005891 A1 | 1/2006 | Doyle | |
| 2006/0011246 A1 | 1/2006 | Leys | |
| 2006/0011247 A1 | 1/2006 | Vu | |
| 2006/0027274 A1 | 2/2006 | Funes et al. | |
| 2006/0027275 A1 | 2/2006 | Eriksson et al. | |
| 2006/0048830 A1 | 3/2006 | Tokuda et al. | |
| 2006/0060253 A1 | 3/2006 | Yoshida et al. | |
| 2006/0185746 A1 | 8/2006 | Doyle | |
| 2006/0207671 A1 | 9/2006 | Chao et al. | |
| 2006/0272720 A1 | 12/2006 | Milburn | |
| 2006/0272721 A1 | 12/2006 | Milburn | |
| 2008/0302434 A1 | 12/2008 | Taskar | |

FOREIGN PATENT DOCUMENTS

WO 96/34705 A1 11/1996

OTHER PUBLICATIONS

European Extended Search Report issued for European Patent No. 07 750 463.7 on May 3, 2010, 7 pgs.

Chinese Office Action and English Translation for Chinese Patent Application No. 200780002493.0, issued on Mar. 26, 2010, 14 pgs.

* cited by examiner

LOW-PROFILE SURFACE MOUNT FILTER

RELATED APPLICATIONS

This application is a divisional of and claims priority under 35 U.S.C. §120 to U.S. patent application Ser. No. 11/353,294, entitled "Low Profile Surface Mount Filter", by DiPrizio et al., filed Feb. 10, 2006, which is hereby fully incorporated by reference herein.

TECHNICAL FIELD OF THE INVENTION

This invention relates generally to filters and more particularly to low-profile surface mount filters.

BACKGROUND OF THE INVENTION

Many manufacturing processes require delivery of relatively high purity gases at regulated flow rates and pressures. In the manufacture of semiconductors, for example, the purity and flow rate of a gas must be carefully regulated to prevent defects on a wafer. The loss of a wafer due to a defect is both expensive and time consuming.

In semiconductor manufacturing, gas is provided to a process chamber through a "gas stick." A gas stick can include a variety of components such as filters, valves, mass flow controllers, pressure transducers or other components to purify the gas, regulate gas flow or monitor properties of the gas or gas flow. Traditionally, components were connected in an "in-line" fashion with each component connected to the next component by a VCR connector. More recently, the semiconductor industry has moved to modular architectures. In a modular architecture, the gas components mount to modular substrate blocks. Flow passages in the substrate blocks route flow between the substrate blocks and hence the gas components. Modular architectures provide the advantage of a reduced footprint and standardization of interfaces.

Figure 1:
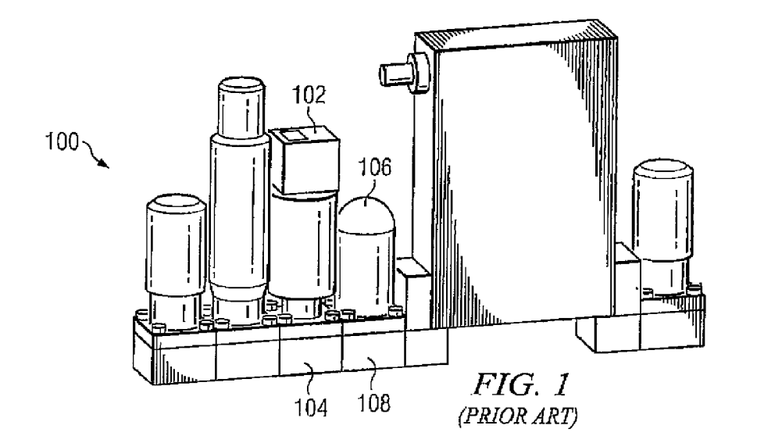
FIG. 1 illustrates one embodiment of a gas stick using a modular architecture and a standalone filter with its required substrate.

FIG. 1 illustrates one embodiment of a gas stick 100 using a modular architecture. In the example of FIG. 1, pressure transducer 102 is mounted on substrate block 104 and filter 106 is mounted on substrate block 108. Gas stick 100 requires substrate 108 to accommodate the standalone filter 106. The additional substrate 108 makes gas stick 100 longer, heavier and more expensive.

Several attempts have been made to shorten the gas stick by using a stackable filter. Prior filters have been made that have a purification element sandwiched between two sections of a block or purification elements vertically aligned with the various flow passages to/from the substrate or components stacked on top of the filter. The first type of filter suffers the disadvantage of requiring multiple seals between various sections of the filter block. The additional mechanical seals can interrupt the flow path, increase wetted surface area and increase dead space. Additionally, the seals may leak due to dimensional or surface finish irregularities between the sealing surfaces of the sections of the filter block. The second type of filter (e.g., the filter in which the purification element is aligned with a flow passage), requires additional height to accommodate the purification element.

Consequently, there is a need for a low-profile filter that minimizes mechanical seals, gas stick length and height while fitting the footprint of modular substrates.

SUMMARY OF THE INVENTION

Embodiments of the present invention provide systems and methods for low-profile filters that substantially eliminate or reduce the disadvantages of previously developed filter systems and methods. More particularly, embodiments of the present invention provide a low-profile filter for use with modular gas panel designs. One embodiment of the present invention includes a filter housing adapted to mount on a substrate block having a plurality of flow paths and a filter cavity defined therein. The filter cavity is defined to extend in a generally horizontal direction when the low-profile filter is in use. A first flow passage is defined to connect an inlet of the filter housing to a first section of the filter cavity and a second flow passage is defined to connect a second section of the filter cavity to an outlet of the filter housing. A filter assembly comprising a filter and adapter is disposed in the filter cavity and sealed to the surface of the filter cavity separating the filter cavity into adjacent sections including the first section of the filter cavity and second section of the filter cavity.

The filter housing can be a unitary piece of material. The filters can include nickel, steel, ceramic TEFLON or other material disk or tube filters. The flow passages, according to various embodiments of the present invention, can be arranged such that the gas is filtered before the gas is routed to a component mounted on top of the filter or after the gas returns from the component. According to other embodiments, the filter can act as a standalone filter in which gas is received from the substrate block, filtered, and returned to the substrate block.

Another embodiment of the present invention can include a method for filtering a gas using a low-profile filter comprising mounting a filter to a substrate block, directing the gas from an inlet in a filter housing to a generally horizontal first filter cavity, flowing the gas into a first filter assembly in a generally horizontal direction and through a first filter to filter the gas, and directing the gas from the first filter cavity to an outlet in the filter housing. Again, gas can be filtered before or after the gas is routed to a component mounted on the low-profile filter. According to other embodiments, the gas can be received from the substrate block, filtered and returned to the substrate block.

Yet another embodiment of the present invention includes a method of making a low-profile filter comprising, forming a filter housing having a top and bottom surface, machining a filter cavity into the filter housing, wherein the filter cavity is oriented to be generally horizontal in use, machining a first flow passage into the filter housing, wherein the first flow passage runs from an inlet in the filter housing to the filter cavity and machining a second flow passage into the filter housing wherein the second flow passage leads from the filter cavity to an outlet, forming a filter assembly and sealing the filter assembly to a surface of the filter cavity to separate the filter cavity into adjacent sections, wherein the first flow passage enters the filter cavity in a first section and the second flow passage enters the filter cavity in a second section.

Embodiments of the present invention provide a technical advantage over previously developed filters by providing a low-profile surface-mount filter that creates a sufficient pressure drop and has a sufficient log reduction value ("LRV") for semiconductor manufacturing applications, while minimizing height.

Embodiments of the present invention provide another advantage by reducing the number of seals in a flow path, thereby reducing wetted surface area and dead space internal to the filter. This can decrease the time it takes to dry the filter (i.e., decrease dry down time) and minimize the potential of stray particles from becoming dislodged from the dead spaces and entering the gas stream.

BRIEF DESCRIPTION OF THE DRAWINGS

A more complete understanding of the present invention and the advantages thereof may be acquired by referring to the following description, taken in conjunction with the accompanying drawings in which like reference numbers indicate like features and wherein.

DETAILED DESCRIPTION OF THE INVENTION

Preferred embodiments of the present invention are illustrated in the FIGURES, like numerals being used to refer to like and corresponding parts of the various drawings.

Embodiments of the present invention provide a system and method for a low-profile filter. The low-profile filter includes, according to one embodiment, a filter housing with ports on the top and bottom for gas ingress/egress. The filter body defines a filter cavity running generally horizontal through the filter body. A filter assembly divides the filter cavity into two horizontally adjacent sections. A first flow passage leads from a port on the top or bottom of the filter body to the first section while a second flow passage leads from another port on the top or bottom to the second section. Based on the configuration of the ports and flow passages, the gas can be filtered before or after the gas flows to a component mounted on top of the low-profile filter.

The filter assembly, according to one embodiment, can include a tube filter and an adapter. The adapter can be a ring or other shape that is coupled to the tube filter and sealed to surface of the filter cavity. When seated in the filter cavity, the filter assembly segregates the filter cavity into two horizontally adjacent sections with the tube filter projecting into one of the sections. Gas enters the first section via the first flow passage, flows through the center of the adapter and permeates into the second section through the tube filter. The gas can then flow out of the second section of the filter cavity via the second flow passage.

According to another embodiment, the filter assembly can include one or more vertical disk membranes sealed across the filter cavity (e.g., generally in a plane normal to the primary horizontal axis of the filter cavity). In this example, gas enters into the first section via the first flow passage, flows through the disk membrane to the second section of the filter cavity and out of the filter cavity via the second flow passage.

The flow passages can be configured and ports arranged such that the gas is filtered before flowing to a component stacked on top of the low-profile filter or after flowing from the component stacked on top of the low-profile filter. Additionally, the flow passages and ports can be configured such that the low-profile filter acts as a standalone filter.

Figure 2:
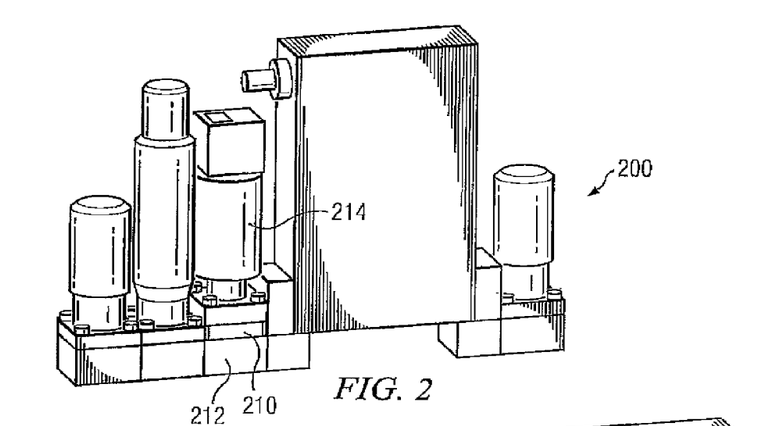
FIG. 2 illustrates an embodiment of a shortened gas stick using a low-profile filter mounted between a substrate block and a component.

FIG. 2 illustrates an embodiment of a gas stick 200 with an example of a low-profile filter 210 according to embodiments of the present invention. In the example of FIG. 2, low-profile filter 210 is mounted between substrate block 212 and pressure transducer 214. In comparison to FIG. 1, one substrate block is eliminated, thereby shortening the gas stick. Additionally, filter 210 is noticeably shorter than filter 106. Low-profile filter 210 can be configured to filter gas before the gas flows to pressure transducer 214, after gas leaves pressure transducer 214 or both.

In operation, gas enters the bottom of low-profile filter 210 through substrate block 212. The gas can either be filtered and passed to pressure transducer 214 or passed pressure transducer 214 and filtered on the way back to substrate block 212. Low-profile filter 210 can be configured to fit a variety of substrate blocks and can be formed to be compatible with, K1S, K1, K1H, C-Seal, W-Seal, CS-Seal or other gas panel substrate blocks known or developed in the art. Additionally, other components than pressure transducer 214 can be mounted to low-profile filter 210 including, but not limited to, mass flow controllers, displays, moisture monitors, gauges, valves, diffusers, pressure regulators or other components known or developed in the art.

Figure 3:
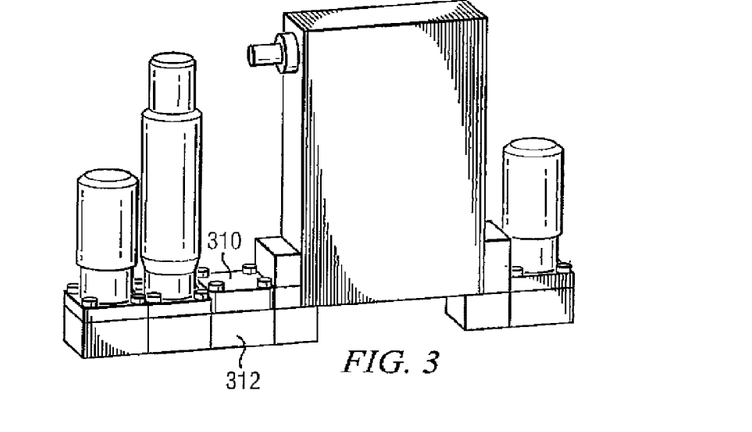
FIG. 3 illustrates an embodiment of a gas stick with a low-profile filter acting as a standalone filter.

FIG. 3 illustrates another embodiment of a gas stick 300 utilizing an embodiment of a low-profile filter 310 mounted on substrate block 312. In the example of FIG. 3, low-profile filter 310 is a standalone filter. However, as in the example of FIG. 2, low-profile filter 310 is noticeably shorter than filter 106. In this example, the gas enters low-profile filter 310 from substrate block 312, passes through a filter and returns to substrate block 312.

Figure 4A:
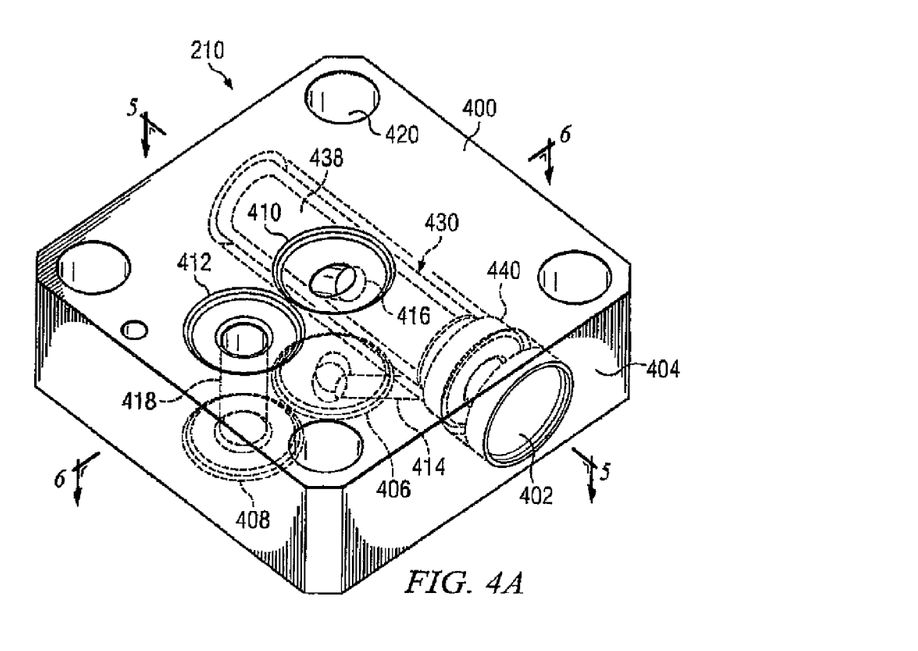
FIG. 4A and FIG. 4B are diagrammatic representations of a low-profile filter.
Figure 4B:
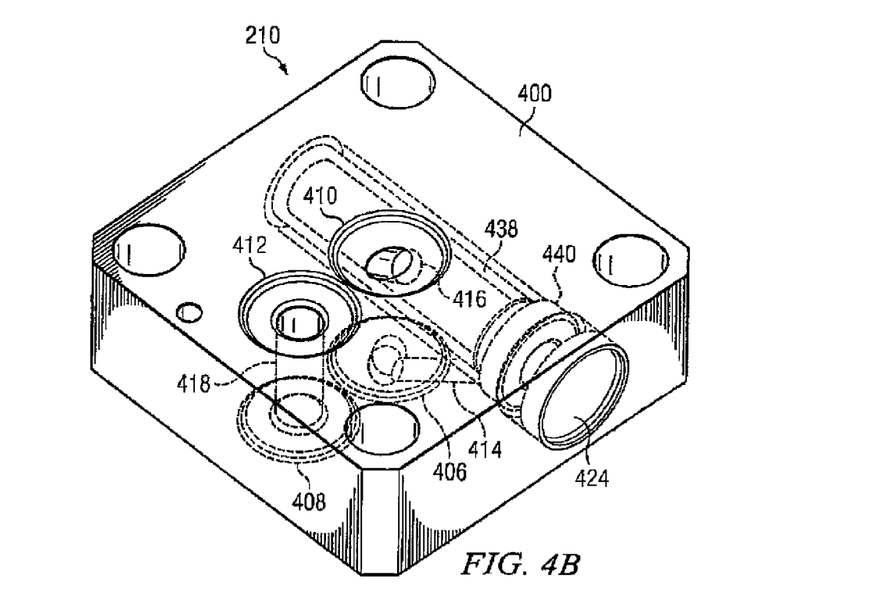

FIGS. 4A and 4B are diagrammatic representations of one embodiment of a low-profile filter 210. Low-profile filter 210 includes a filter housing 400 having a generally horizontal filter cavity 402 therein. Although only shown as originating from surface 404, filter cavity 402 can originate from additional exterior surfaces of filter housing 400 to facilitate insertion of filter assembly 430 (discussed below). One or more ports (e.g., port 406, port 408, port 410, port 412) on the top surface and bottom surface of filter housing 400 act as inlets or outlets to low-profile filter 210. Flow passages defined in filter housing 400 lead gas to/from filter cavity 402 and to/from the inlet/outlet ports. For example, flow passage 414 runs from bottom port 406 to filter cavity 402 while flow passage 416 runs from filter cavity 402 to top port 410. Flow passage 418 is a pass through passage running between bottom port 408 and top port 412. Filter housing 400 can further include various connector holes (one of which is indicated at 420) to allow filter housing 400 to be connected to a substrate block.

Filter housing 400 is formed of a material suitable for directing gas flow such as stainless steel, though other materials can be used. Various characteristics of filter housing 400 can be configured to allow low-profile filter 210 to be compatible with a variety of substrate blocks and components. By way of example, but not limitation, low-profile filter 210 can be compatible with a C-Seal architecture. Consequently, filter housing 400 can be 1.125 inches wide, 1.125 inches deep (i.e., can have approximately the same footprint as a C-Seal substrate block) and 0.375 inches high. In this example, port 406 will act as the inlet port to low-profile filter 210, port 410 will act as the outlet port to provide gas to a component stacked on top of low-profile filter 210 (i.e., according to the C-Seal architecture, the center port is the inlet port of a component), port 410 will provide filtered gas to the stacked component and port 408 will be the outlet port to the substrate block. Thus, for the component stacked on top of low-profile filter 210, filter housing 400 can provide the same port arrangement as a C-Seal substrate block.

Filter housing 400, according to one embodiment, is a unitary stainless steel block. Filter cavity 402, ports 406, 408, 410, and 412 are machined into the stainless steel block using known machining techniques. Filter cavity 402, for example, can have a diameter of 0.276 inches. The various flow passages and mounting holes can then be drilled. It should be noted that some semiconductor manufacturers specify that the hole in the center of a C-seal port leading to a flow passage can have a major diameter of no larger than 0.180 inches. The angle of the flow passage and diameter of flow passage can be chosen such that the circle or ellipse (if drilled at an angle) at the entrance of the flow passage is no greater than a specified size (e.g., 0.180 inches). Assuming flow passage 416 is drilled at an angle to the top surface of housing 400 such that an elliptical inlet is formed, the angle and diameter of flow passage 416 running from filter cavity 402 to port 410 can be selected so that the major diameter of the inlet is no greater than 0.180 inches or other specified size.

According to one embodiment, flow passage 414 from port 406 to filter cavity 402 is machined in two stages. The first portion is machined from inlet port 406 into filter housing 400. Again, the angle and radius of flow passage 416 can be selected such that the elliptical inlet to flow passage 416 does not exceed specified dimensions. The second portion of flow passage 416 can be machined inward from the surface of filter cavity 402 at an angle to meet with the first section of flow passage 414. The portion of flow channel 414 machined first will typically have a slightly larger diameter than the portion machined second, making it easier to ensure that the second portion cleanly meets the first portion during machining. For example, the first portion of flow passage 414 can have a diameter of 0.125 inches while the diameter of the second portion (the smaller portion) can be 0.094 inches. Flow passage 416, according to one embodiment can also have a diameter of approximately 0.125 inches, while flow passage 420 can have a diameter up to 0.180 inches in this example. It should be noted, however, any machining techniques can be used to form filter housing 400.

Figures 5, 6:
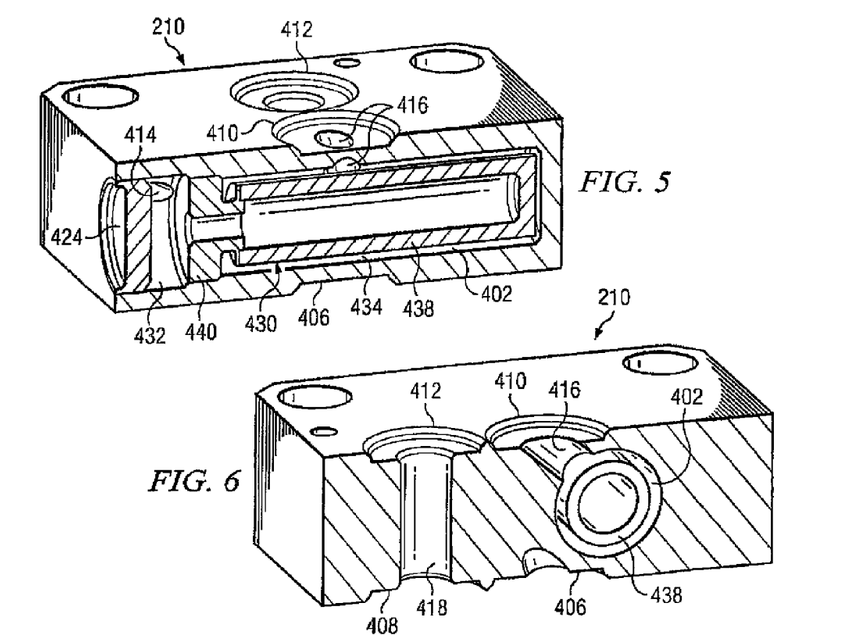
FIG. 5 is a diagrammatic representation of a cutaway view of an embodiment of a low-profile filter according to FIG. 4A.
FIG. 6 is a diagrammatic representation of another cutaway view of an embodiment of a low-profile filter according to FIG. 4A.

A filter assembly 430 is disposed in filter cavity 402 and separates filter cavity 402 into two horizontally adjacent sections, shown generally at 432 and 434 (see, FIG. 5). Flow passage 414 enters filter cavity 402 in section 432 and flow passage 416 enters filter cavity in section 434. Thus, the flow passage from the inlet port 406 to the filter cavity 402 (i.e., flow passage 414) and the flow passage from filter cavity 402 to the outlet port 410 are segregated by filter assembly 430.

According to the embodiment of FIG. 4, filter assembly 430 includes tube filter 438 coupled to adapter 440. However, filter assembly 430 can include any filter mechanism for segregating filter cavity 402 such that gas is filtered between the sections. Tube filter 438 can include any tube filter suitable for a set of process requirements. By way of example, but not limitation, tube filter 438 can be a 0.003 micron stainless steel or nickel filter. Examples of steel and nickel tube filters include Mykrolis Corp. Wafergard SL Gas Filters WGSLSFC1M and WGSLNFC1M respectively in these examples the wall thickness is about 0.020-0.065 inches with a pore size of 5-10 microns. (Mykrolis Corp. is based in Billerica, Mass. and has merged with Entegris Corp. of Chaska, Minn.) Other examples of filter materials include ceramic, TEFLON and other filter materials (TEFLON is a registered trademark of E.I. du Pont de Nemours and Company of Wilmington, Del.). Adapter 440 can be stainless steel or other material.

Tube filter 438 is welded or otherwise coupled to adapter 440 to form filter assembly 430. The filter assembly is inserted into filter cavity 402 and a seal formed between filter assembly 430 and the walls of filter cavity 402. According to one embodiment, the seal is formed through an interference fit between adapter 440 and the wall of filter cavity 402. According to this embodiment, the radius or outer dimension of adapter 440 is slightly larger than the radius or outer dimension of filter cavity 402 at the area where adapter 440 will seal with the wall of filter cavity 402. For example, at ambient temperature adapter 440 can have a radius of be 0.0005-0.0015 inches greater than the radius of filter cavity 402 in the area that the seal is to be formed. Filter assembly 430 can be forced into filter cavity 402 using a press to form the interference seal between adapter 440 and filter cavity 402. According to another embodiment, filter assembly 430 can be chilled (e.g., with liquid Nitrogen or other chilling method) and filter housing 400 heated. While filter assembly 430 is contracted due to cooling and filter cavity 402 dilated due to heating, filter assembly 430 is placed in filter cavity 402. As filter assembly 430 and filter housing 400 reach ambient temperature, an interference seal will form between filter adapter 440 and the walls of filter cavity 402. In another embodiment the filter assembly 430 can be welded to the filter cavity 402 using e-beam, laser, tig or plasma.

Filter cavity 402 can be sealed at surface 404 using a sealing button, plug or other piece of material 424 (shown in FIG. 4B and FIG. 5). The sealing button can be formed of stainless steel or other material that is preferably non-reactive or minimally reactive with the intended process gas. According to one embodiment, sealing button is sealed to filter housing 400 using a fusion weld.

In operation, low-profile filter 210 is mounted to a substrate, as shown in FIG. 2. Gas enters flow passage 414 through port 406 and flows to section 432 of filter cavity 402. The gas then flows through the center of adapter 440 into tube filter 438 and permeates through the wall of tube filter 438 into section 434 of filter cavity 402. The filtered gas flows from filter cavity 402 to port 410 via flow passage 416 to a component mounted on low-profile filter 210.

According to other embodiments, flow passage 414 can enter filter cavity 402 in section 434 and flow passage 416 can enter filter cavity 402 in section 432. Consequently, gas will be filtered by passing from the outside of tube filter 438 to the inside of tube filter 438.

FIG. 5 is a diagrammatic representation of a cutaway view of low-profile filter 210 showing filter cavity 402 from the side. Shown in FIG. 5 is filter housing 400 including bottom port 406, top ports 410 and 412 and filter cavity 402. FIG. 5 also illustrates filter assembly 430 including tube filter 438 and adapter 440. Sealing button 424 is also shown. As can be seen in FIG. 5, filter assembly 430 separates filter cavity 402 into horizontally adjacent section 432 and section 434. Flow passage 414 runs from bottom port 406 to filter cavity 402 while flow passage 416 runs from port 410 to filter cavity 402. In this example, gas flows from a substrate block into port 406 and enters filter cavity 402 via flow passage 414 in section 432. The gas flows through the center of adapter 440 into the center of tube filter 438 and permeates out of tube filter 438 into section 434. The gas then flows out of filter cavity 402 through flow passage 416 and through port 410 to a component mounted on low-profile filter 210. The gas returns from the component through port 412 and is lead back to the substrate block. In this example, the gas is filtered prior to entering the component.

FIG. 6 is a diagrammatic representation of a cutaway view of low-profile filter 210 of FIG. 4A. FIG. 6 illustrates filter housing 400, port 406, port 408, port 410, port 412, flow passage 416, flow passage 418 and tube filter 438. According to one embodiment, flow passage 416 directs gas filtered by tube filter 438 to a component mounted on low-profile filter 210. Gas returning from the component enters filter housing 400 at port 412. Flow passage 418 is a pass-through flow passage that leads the gas from port 412 to port 408 and the underlying substrate block.

Figure 7:
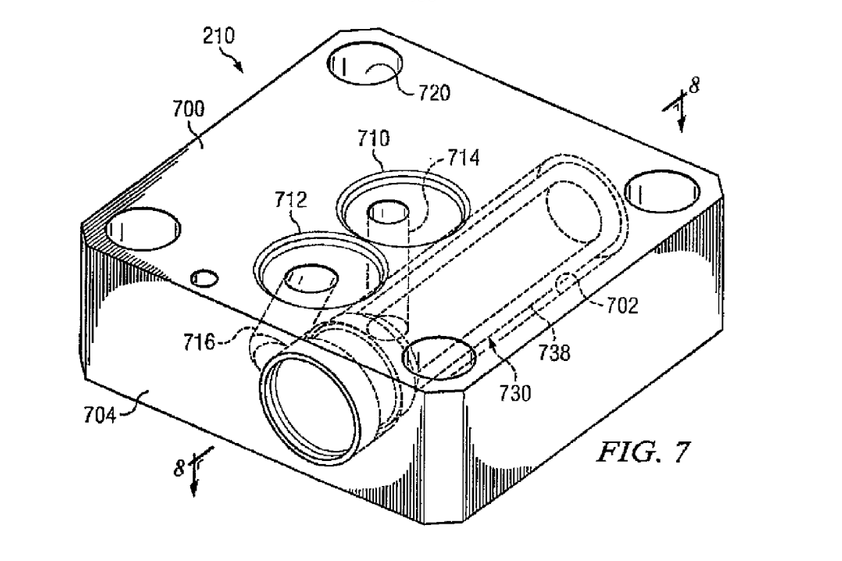
FIG. 7 is a diagrammatic representation of another embodiment of a low-profile filter.

In the previous embodiments, low-profile filter 210 filters gas prior to providing the gas to the component mounted on low-profile filter 210. In other embodiments, however, low-profile filter 210 can filter the gas after has been output by the component back to low-profile filter 210. FIG. 7 is a diagrammatic representation of a low-profile filter 210 for filtering gas on the outlet side of the component. According to the embodiment of FIG. 7, low-profile filter 210 includes a filter housing 700 having a generally horizontal filter cavity 702 therein. Although only shown as originating from surface 704, filter cavity 702 can originate from additional exterior surfaces of filter housing 700 to facilitate insertion of filter assembly 730 (discussed below). One or more ports (e.g., port 706, port 708, port 710, port 712 (ports 706 and 708 are better viewed in FIG. 8)) on the top surface and bottom surface of filter housing 700 act as inlets or outlets to low-profile filter 210. Flow passages defined in filter housing 700 lead gas to/from filter cavity 702 and to/from the inlet/outlet ports. For example, flow passage 714 runs from bottom port 706 to top port 710. Flow passage 716 runs from top port 712 to filter cavity 702 while flow passage 718 (shown in FIG. 8) runs from filter cavity 702 to bottom port 708. Filter housing 700 can further include various connector holes (indicated at 720) to allow filter housing 700 to be connected to a substrate block. Filter housing 700 can be formed of a unitary block of material and can be dimensioned and machined in a manner similar to that described in conjunction with filter housing 400 of FIGS. 4A and 4B but with the flow passages arranged to provide outlet side filtering.

Figure 8:
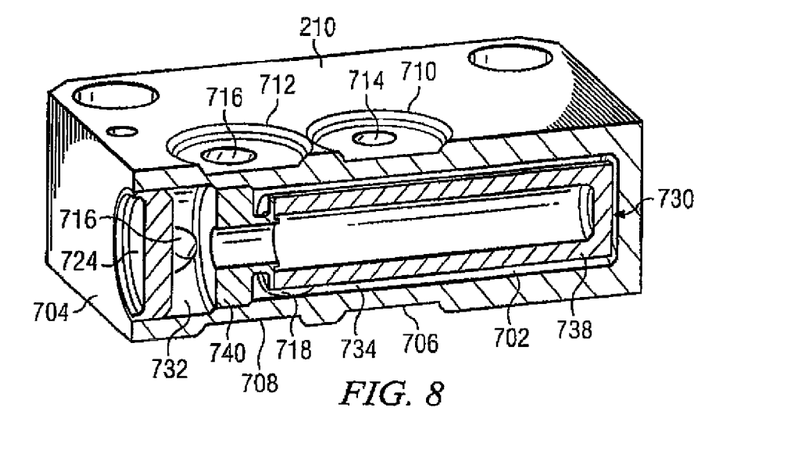
FIG. 8 is a diagrammatic representation of a cutaway view of the low-profile filter of FIG. 7.

A filter assembly 730 is disposed in filter cavity 702 and separates filter cavity 702 into two horizontally adjacent sections, shown generally at 732 and 734 (shown in FIG. 8). Flow passage 716 enters filter cavity 702 in section 732 and flow passage 718 enters filter cavity in section 734. Thus, the flow passage from the top inlet port 712 to the filter cavity 702 (i.e., flow passage 716) and the flow passage from filter cavity 702 to the bottom outlet port 708 (i.e., flow passage 718) are segregated by filter assembly 730.

According to the embodiment of FIG. 7, filter assembly 730 includes tube filter 738 coupled to adapter 740 (better seen in FIG. 8). However, filter assembly 730 can include any filter mechanism for segregating filter cavity 702 such that gas is filtered between the sections. Tube filter 738 can include any tube filter suitable for a set of process requirements. By way of example, but not limitation, tube filter 738 can be a 0.003 micron stainless steel or nickel filter. Adapter 740 can be stainless steel or other material.

Filter assembly 730 can be formed in a similar manner as filter assembly 430 of FIG. 4A and can be coupled to filter housing 700 to form an interference seal or other seal. Filter cavity 702 can be sealed at surface 704 using a sealing button 724 (shown in FIG. 8) or other piece of material. Button 724 can be formed of stainless steel or other material that is preferably non-reactive or minimally reactive with the intended process gas. According to one embodiment, button 724 is sealed to filter housing 700 using a fusion weld.

In operation, low-profile filter 210 is mounted to a substrate, as shown in FIG. 2. Gas enters flow passage 714 through port 706 and flows to the component mounted on top of low-profile filter 210 via port 710. The component returns the gas to low-profile filter 210 via port 712. The gas flows through flow passage 716 to filter cavity 702. The gas then flows through the center of adapter 740 into tube filter 738 and permeates through the wall of tube filter 738 into section 734 of filter cavity 702. The filtered gas flows from filter cavity 702 to port 708 via flow passage 718 back to the substrate upon which low-profile filter 210 is mounted.

According to other embodiments, flow passage 716 can enter filter cavity 702 in section 734 and flow passage 718 can enter filter cavity 702 in section 732. Consequently, gas will be filtered by passing from the outside of tube filter 738 to the inside of tube filter 738. Regardless, filtering gas on the outlet side of the mounted component provides the advantage that any contaminants introduced by the component are filtered before the gas is routed to other components.

FIG. 8 is a diagrammatic representation of a cutaway view of low-profile filter 210 of FIG. 7. Shown in FIG. 8 is filter housing 700 including bottom ports 706 and 708, top ports 710 and 712 and filter cavity 702. Also shown is filter assembly 730 including tube filter 738 and adapter 740. FIG. 8 further illustrates sealing button 724. As can be seen in FIG. 8, filter assembly 730 separates filter cavity 702 into horizontally adjacent section 732 and section 724. Flow passage 716 runs from top port 712 to filter cavity 702 while flow passage 718 runs from filter cavity 702 to bottom port 708. In this example, gas flows from a substrate block into port 706 and through to port 710. On the return path from the component mounted to low-profile filter 210, the gas flows from port 712 to filter cavity 702, through the center of adapter 740 into the center of tube filter 738 and permeates out of tube filter 738 into section 734. The gas then flows out of low-profile filter 210 through port 708 to the substrate block. Again, however, the orientation of flow passages can be reversed such that gas is filtered by passing gas from the outside of tube filter 738 to the center of tube filter 738.

Figure 9A:
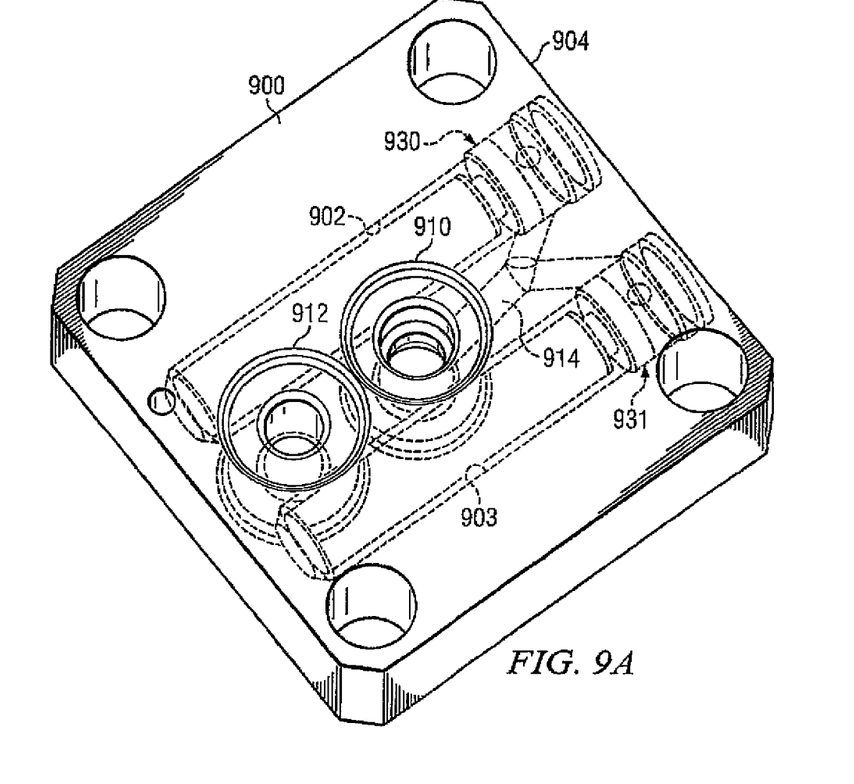
FIG. 9A and FIG. 9B are diagrammatic representations of another embodiment of a low-profile filter.
Figure 9B:
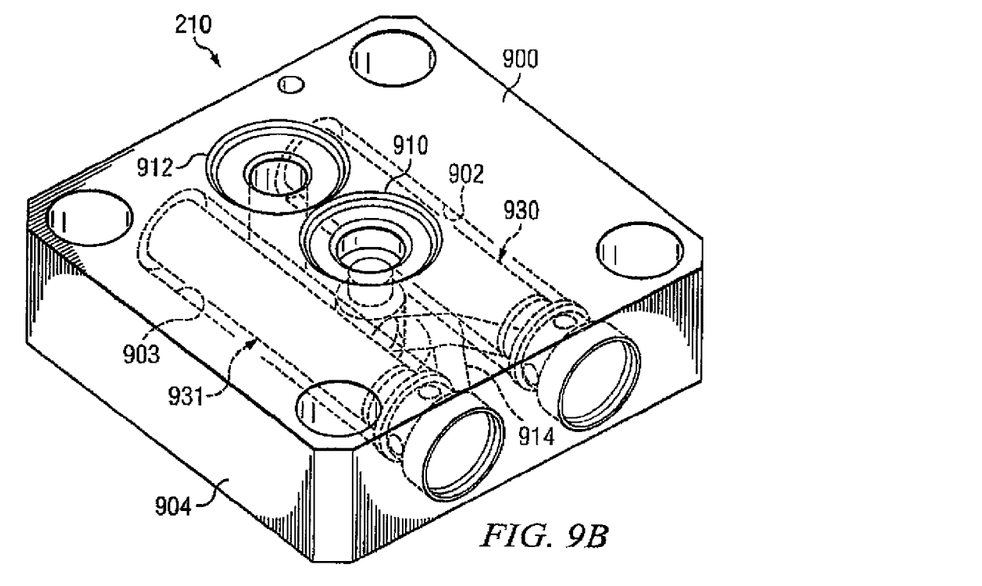

Previously described embodiments of the present invention utilize a single filter. According to another embodiment of the present invention, multiple filters can be used. FIGS. 9A and 9B are diagrammatic representations of one embodiment of a dual filter configuration low-profile filter 210. According to the embodiment of FIGS. 9A and 9B, low-profile filter 210 includes a filter housing 900 having a pair of generally horizontal filter cavities 902 and 903 therein. Although only shown as originating from surface 904, filter cavities 902 and 904 can originate from additional exterior surfaces of filter housing 900 to facilitate insertion of filter assemblies 930 and 931. One or more ports on the top surface and bottom surface of filter housing 900 act as inlets or outlets to low-profile filter 210. From the perspective of FIGS. 9A and 9B only top ports 910 and 912 are indicated. Flow passages defined in filter housing 900 lead gas to/from the filter cavities 902 and 903 and to/from the inlet/outlet ports. For example, flow passage 914 runs from a bottom port to filter cavity 902 and filter cavity 903. Furthermore, a flow passage leads from filter cavity 902 to port 910 while another flow passage runs from filter cavity 903 to port 910. The flow passage from port 912 to the bottom outlet port acts as a pass through passage.

A filter assembly 930 is disposed in filter cavity 902 and a second filter assembly 931 is disposed in filter cavity 903. Filter assembly 930 separates filter cavity 902 into two horizontally adjacent sections, while filter assembly 931 separates filter cavity 903 into two horizontally sections. Flow passage 914 enters filter cavity 902 in the first section of filter cavity 902 and filter cavity 903 in the first section of filter cavity 903. The outlet flow passage (e.g., running from filter cavity 902 to port 910) enters filter cavity 902 in the second section of filter cavity 902 while the outlet flow passage of filter cavity 903 (e.g., running from filter cavity 903 to port 910) enters filter cavity 903 in the second section of filter cavity 903. Thus, flow passage 914 is separated from the outlet of filter cavity 902 by filter assembly 930 and the outlet of filter cavity 903 by filter assembly 931.

According to the embodiment of FIGS. 9A and 9B, filter assembly 930 and filter assembly 931 can be similar to the previously described filter assemblies and can include an adapter and tube filter. However, either filter assembly can include any filter mechanism for segregating the respective filter cavity into sections such that gas is filtered between the sections. By way of example, but not limitation, the tube filters can be a 0.003 micron stainless steel or nickel filter while the adapters can be stainless steel or other material.

Filter assemblies 930 and 931 can be formed in a similar manner as filter assembly 430 of FIG. 4A and FIG. 4B and can be coupled to filter housing 900 to form an interference seal or other seal. Filter cavity 902 and filter cavity 903 can be sealed at surface 904 using a sealing button or plug formed of stainless steel or other material that is preferably non-reactive or minimally reactive with the intended process gas. The plugs or sealing buttons can be sealed to filter housing 900 using a fusion weld.

In operation, low-profile filter 210 is mounted to a substrate, as shown in FIG. 2. Gas enters flow passage 914 through a bottom port and flows to filter cavity 902 and 903. The gas flows through the center of filter assemblies 930 and 931 and permeates into the other sections of filter cavity 902 and 903, respectively. Again, however, this flow can be reversed such that the gas is filtered by flowing into, rather than out of, the tube filters. Flow passages direct gas to port 910 from filter cavity 902 and filter cavity 903. Gas returns from component through port 912, through a pass through flow passage and out an outlet port on the bottom of filter housing 900. Thus, the flow path is similar to that described in conjunction with FIGS. 4A, 4B and 5 except that the gas is directed to two filter cavities in parallel to filter the gas before the gas is directed to the component stacked on top of low-profile filter 210.

In the example of FIG. 9A-9B, low-profile filter 210 acts as an inlet filter. However, low-profile filter 210 can be configured as a dual filter for the outlet side of a component. According to another embodiment, one filter can act on the inlet side of the component while the other filter can act on the outlet side of the component. According to other embodiments, both filter can be in the same filter cavity (e.g., inserted from each end) and the gas recirculated through the filter cavity.

The use of dual filters provides an advantage over a single filter because the dual filters can provide for greater surface area using a small diameter. This can allow for a greater or similar pressure drop to a single filter, while allowing the height of filter housing 900 to be reduced. Additionally, multiple smaller diameter filters can be used for filter housings in which the port placement does not allow a larger filter to fit.

Figure 10:
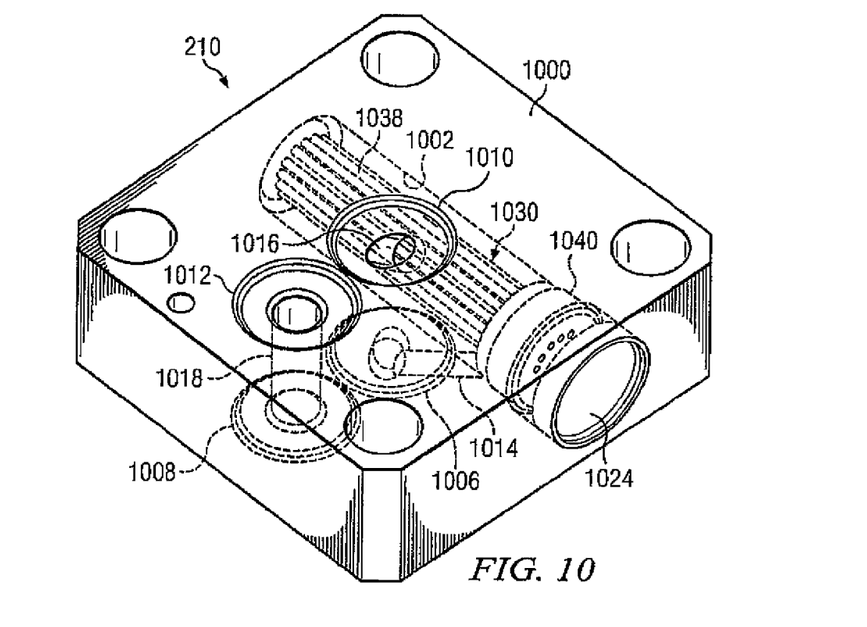
FIG. 10 is a diagrammatic representation of another embodiment of a low-profile filter.

FIG. 10 is a diagrammatic representation of yet another embodiment of low-profile filter 210. Low-profile filter 210 includes a filter housing 1000 having a generally horizontal filter cavity 1002 therein. Although only shown as originating from one surface, filter cavity 1002 can originate from additional exterior surfaces of filter housing 1000 to facilitate insertion of filter assembly 1030. One or more ports (e.g., port 1006, port 1008, port 1010, port 1012) on the top surface and bottom surface of filter housing 1000 act as inlets or outlets to low-profile filter 210. Flow passages defined in filter housing 1000 lead gas to/from filter cavity 1002 and to/from the inlet/outlet ports. For example, flow passage 1014 runs from bottom port 1006 to filter cavity 1002 while flow passage 1016 runs from filter cavity 1002 to top port 1010. Flow passage 1018 is a pass through passage running between bottom port 1008 and top port 1012. Filter housing 1000 can further include various connector holes to allow filter housing 1000 to be connected to a substrate block.

A filter assembly 1030 is disposed in filter cavity 1002 and separates filter cavity 1002 into two horizontally adjacent sections. Flow passage 1014 enters filter cavity 1002 in the first section and flow passage 1016 enters filter cavity in the second section. Thus, the flow passage from the inlet port 1006 to the filter cavity 1002 (i.e., flow passage 1014) and the flow passage from filter cavity 1002 to the outlet port 1010 are segregated by filter assembly 1030.

According to the embodiment of FIG. 10, filter assembly 1030 includes tube filter 1038 coupled to adapter 1040. However, filter assembly 1030 can include any filter mechanism for segregating filter cavity 1002 such that gas is filtered between the sections. Tube filter 1038 can include any tube filter suitable for a set of process requirements. Tube filter 1038, according to one embodiment of the present invention, is a TEFLON filter comprising multiple TEFLON tubes (e.g., hollow fibers) that are open to the first section. The tubes can optionally be straight tubes or, for example, "U" shaped tubes. Adapter 1040 can be a stainless steel ring. Examples of similar TEFLON tubes can be found in Mykrolis Corp. pHasor Membrane Contactor PH2005F0F. According to one embodiment, the TEFLON tubes have a pore size of approximately 5 microns and a wall thickness of 0.006-0.012 inches, though the pore size, tube length and wall thickness can be controlled during the process of making the tubes. A layer of TEFLON seals the gaps between the TEFLON tubes and between the TEFLON tubes and adapter 1040. One embodiment for forming filter assembly 1030 is described in greater detail in conjunction with FIG. 11.

Filter assembly 1030 is inserted into filter cavity 1002 and a seal formed between filter assembly 1030 and the walls of filter cavity 1002. According to one embodiment, the seal is formed through an interference fit between adapter 1040 and the wall of filter cavity 1002. According to this embodiment, the radius or outer dimension of adapter 1040 is slightly larger than the radius or outer dimension of filter cavity 1002 at the area where adapter 1040 will seal with the wall of filter cavity 1002. For example, at ambient temperature adapter 1040 can have a diameter of be 0.001 to 0.002 inches greater than the diameter of filter cavity 1002 in the area that the seal is to be formed. Filter assembly 1030 can be forced into filter cavity 1002 using a press to form the interference seal between adapter 1040 and filter cavity 1002. According to another embodiment, filter assembly 1030 can be chilled (e.g., with liquid Nitrogen or other chilling method) and filter housing 1000 heated. While filter assembly 1030 is contracted due to cooling and filter cavity 1002 dilated due to heating, filter assembly 1030 is placed in filter cavity 1002. As filter assembly 1030 and filter housing 1000 reach ambient temperature, an interference seal will form between filter adapter 1040 and the walls of filter cavity 1002.

Filter cavity 1002 can be sealed at the surface of housing 1000 using a sealing button 1024 or other piece of material. Button 1024 can be formed of stainless steel or other material that is preferably non-reactive or minimally reactive with the intended process gas. According to one embodiment, button 1024 is sealed to filter housing 1000 using a fusion weld.

In operation, low-profile filter 210 is mounted to a substrate, as shown in FIG. 2. Gas enters flow passage 1014 through port 1006 and flows into the first section of filter cavity 1002. The gas then flows through the open ends of the TEFLON tubes exposed to the first section of filter cavity 1002 and permeates through the walls of the tubes into the other section of filter cavity 1002. The filtered gas flows from filter cavity 1002 to port 1010 via flow passage 1016 to a component mounted on low-profile filter 210. According to other embodiments, the flow passages can be arranged such that gas will be filtered by passing from the outside of tube filter 1038 to the inside of the TEFLON tubes.

In the example of FIG. 10, gas is filtered on the inlet side of component mounted to low-profile filter 210. According to other embodiments, gas can be filtered on the outlet side of the component or both the inlet and outlet side. Additionally, multiple TEFLON (or other material) filters can be used to filter can on the inlet side, outlet side or both.

Figure 11:
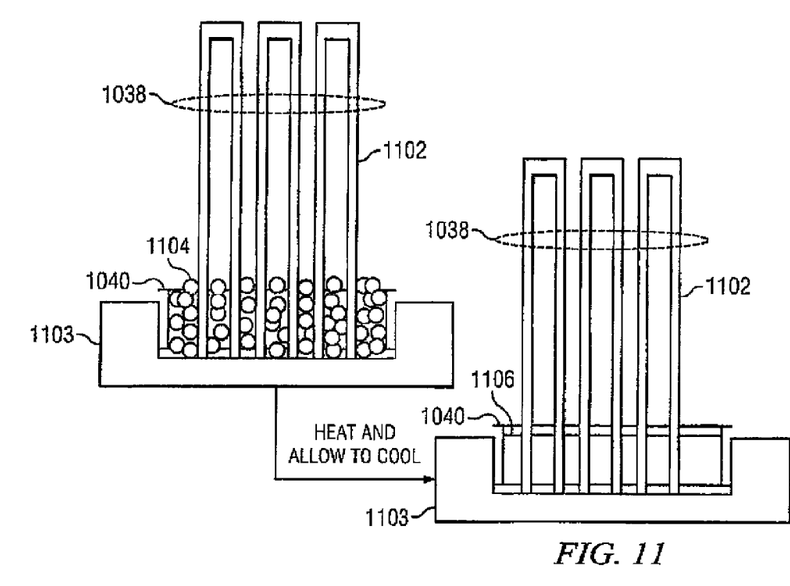
FIG. 11 is a diagrammatic representation of an embodiment of making a filter assembly.

FIG. 11 illustrates one embodiment of forming filter assembly 1030. Adapter 1040 and multiple TEFLON tubes (e.g., such as tube 1102) are placed in a crucible 1103. Small TEFLON beads are interspersed between the tubes (e.g., beads 1104) to act as a potting material. Preferably, beads 1104 have a lower melting temperature than the TEFLON tubes and adapter 1040. For example, TEFLON tubes can be PFA TEFLON while the TEFLON beads can be MFA TEFLON. The crucible is heated to a temperature that melts beads 1104, but not the TEFLON tubes or adapter 1040. When the beads have melted to fill in the gaps between the tubes and the gaps between the tubes and adapter 1040, the crucible can be cooled to ambient temperature to allow the melted TEFLON to cool into TEFLON seal 1106. The end of the TEFLON tubes can then be cut off to ensure that the tubes are not plugged by the TEFLON seal 1106. For example, the tubes can be made flush with adapter 1040. While TEFLON seal 1106 may not bond completely with adapter 1040 (e.g., due to the respective material properties of the TEFLON and adapter), a mechanical seal between the TEFLON seal 1106 and adapter 1040 can be completed when adapter 1040 is deformed through establishing the interference fit with filter housing 1000 (i.e., when the adapter is "squeezed" by the filter cavity walls to form an interference fit).

Figure 12:
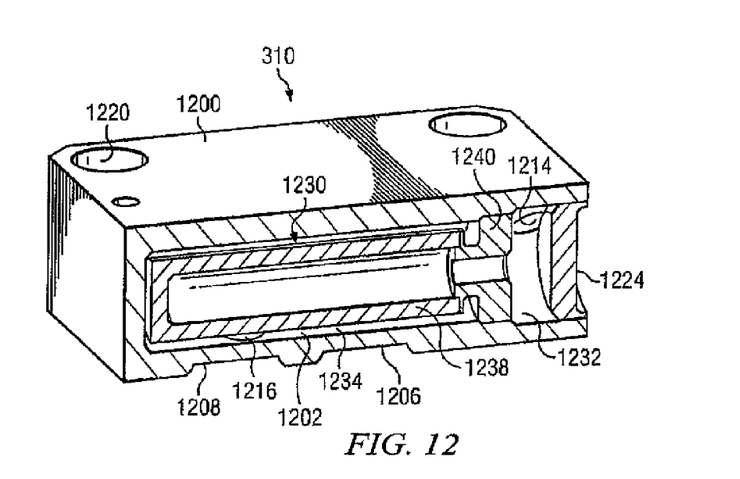
FIG. 12 is a cutaway view of another embodiment of a low-profile filter.

Thus far, the low-profile filter has been described in the context of a filter that is located between a substrate block and a component. According to other embodiments, however, low-profile filter car be a standalone filter (e.g., low-profile filter 310 of FIG. 3). FIG. 12 is a diagrammatic representation of one embodiment of a cutaway view of low-profile filter 310. Low-profile filter 310 includes a filter housing 1200 having a generally horizontal filter cavity 1202 therein. Although only shown as originating from one surface, filter cavity 1202 can originate from additional exterior surfaces of filter housing 1200 to facilitate insertion of filter assembly 1230. One or more ports (e.g., port 1206, and port 1208) on the bottom surface of filter housing 1200 act as inlets or outlets to low-profile filter 310. Flow passages defined in filter housing 1200 lead gas to/from filter cavity 1202 and to/from the inlet/outlet ports. For example, flow passage 1214 runs from bottom port 1206 to filter cavity 1202 while flow passage 1216 runs from filter cavity 1202 to bottom port 1208. Filter housing 1200 can further include various connector holes (indicated at 1220) to allow filter housing 1200 to be connected to a substrate block.

Filter housing 1200 is formed of a material suitable for directing gas flow such as stainless steel, though other materials can be used. Various characteristics of filter housing 1200 can be configured to allow low-profile filter 310 to be compatible with a variety of substrate blocks and components. By way of example, but not limitation, low-profile filter 310 can be compatible with a C-Seal architecture.

A filter assembly 1230 is disposed in filter cavity 1202 and separates filter cavity 1202 into two horizontally adjacent sections, shown generally at 1232 and 1234. Flow passage 1214 enters filter cavity 1202 in section 1232 and flow passage 1216 enters filter cavity in section 1234. Thus, the flow passage from the inlet port 1206 to the filter cavity 1202 (i.e., flow passage 1214) and the flow passage from filter cavity 1202 to the outlet port 1208 are segregated by filter assembly 1230. Filter assembly 1230 can include a filter assembly similar to filter assemblies 430, 730, 930, 931, 1030 or other filter assemblies.

In operation, low-profile filter 310 is mounted to a substrate, as shown in FIG. 3. Gas enters flow passage 1214 through port 1206 and flows to section 1232 of filter cavity 1202. The gas then flows through the center of adapter 1240 into tube filter 1238 and permeates through the wall of tube filter 1238 into section 1234 of filter cavity 1202. The filtered gas flows from filter cavity 1202 to port 1208 via flow passage 1216 back to the substrate block.

According to other embodiments, flow passage 1214 can enter filter cavity 1202 in section 1234 and flow passage 1216 can enter filter cavity 1202 in section 1232. Consequently, gas will be filtered by passing from the outside of tube filter 1238 to the inside of tube filter 1238. Additionally, it should be understood that filter 310 can include multiple filter cavities for filtering the gas in parallel or series.

Figure 13:
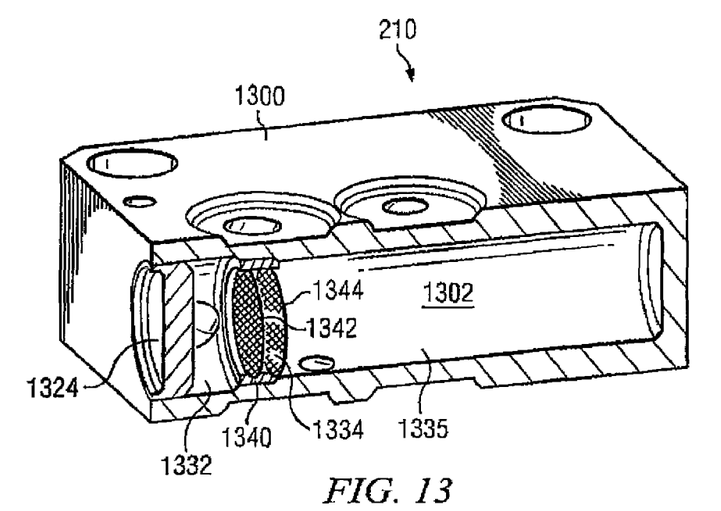
FIG. 13 is a cutaway view of another embodiment of a low-profile filter.

FIG. 13 is a diagrammatic representation of another embodiment of the present invention. According to the embodiment FIG. 13 low-profile filter 210 includes a filter housing 1300 having a generally horizontal filter cavity 1302 therein. Although only shown as being open to one surface, filter cavity 1302 can be open to additional exterior surfaces of filter housing 1300. Various ports and flow passages (not shown) can be arranged in a manner similar to those previously described or in other suitable arrangements.

A filter assembly 1330 is disposed in filter cavity 1302 and separates filter cavity 1302 into three horizontally spaced sections, shown generally at 1332, 1334 and 1335. The inlet to filter cavity 1302 enters in section 1332 and the outlet exits at section 1335. Gas enters filter cavity 1302, flows through filter assembly 1330 and exits filter cavity 1302.

According to the embodiment of FIG. 13, filter assembly 1330 includes one or more disk filters (e.g., disk filters 1342, 1344) across filter cavity 1302 such that gas flows through the disk filters in a primarily horizontal direction. Each disk filter can include any filter suitable for a set of process requirements, including by way of example but not limitation, steel, ceramic, nickel or other disk filters. Adapter 1340 is welded or otherwise coupled to the disk filters to form a seal. As described above, adapter 1340 can be sealed to housing 1300 using an interference fit or other seal. While, in the example above, a single adapter seats multiple disks, in other embodiments, multiple adapters can be used.

Filter cavity 1302 can be sealed using a sealing button 1324 or other piece of material. Button 1324 can be formed of stainless steel or other material that is preferably non-reactive or minimally reactive with the intended process gas. According to one embodiment, button 1324 is sealed to filter housing 1300 using a fusion weld. Thus, embodiments of the present invention can provide low-profile filters that uses one or more disk filters to filter a gas.

Figure 14:
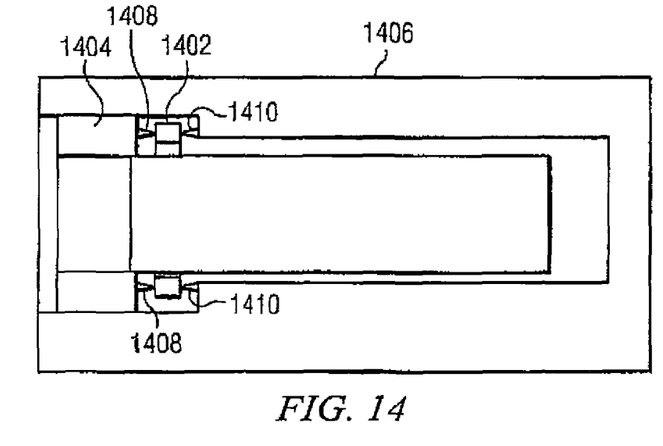
FIG. 14 is a diagrammatic representation of a sealing mechanism for a low-profile filter.

In the previous embodiments, the seal between an adapter and filter housing is primarily described as an interference seal caused by the difference in size of the adapter and filter cavity, though other seals can be used. FIG. 14 is a diagrammatic representation of an other example of a mechanical seal that can be used. In the embodiment of FIG. 14, a metal or other material gasket 1402 (e.g., a steel ring or other gasket) is placed between filter housing 1406 and adapter 1404. Each of filter housing 1406 and adapter 1404 can include a thin protruding edge (e.g., edge 1408 and edge 1410). When adapter 1404 is pressed into the filter cavity, the respective edges dig into gasket 1402, creating a mechanical seal.

Embodiments of the present invention thus provide low-profile filters that can fit between components of a gas stick or act as a standalone filter with minimal impact on overall gas stick height. The low-profile filters can filter on the inlet side, outlet side or both sides of a component mounted thereon. While specific examples of dimensions and filters have been used, these examples are for the purposes of illustration. Other suitable dimensions and materials can be used. Moreover, any suitable filter, such as a pleated filter can be used.

Various embodiments of the present invention provide advantages over prior art filters by reducing the number of components required and reducing the number of seals per filter required. This reduces the number of seals that potentially interrupt the gas flow path, minimal internal wetted surface are, minimal internal dead space, reduced likelihood of leakage and reduced filter height.

Although the present invention has been described in detail herein with reference to the illustrative embodiments, it should be understood that the description is by way of example only and is not to be construed in a limiting sense. It is to be further understood, therefore, that numerous changes in the details of the embodiments of this invention and additional embodiments of this invention will be apparent to, and may be made by, persons of ordinary skill in the art having reference to this description. It is contemplated that all such changes and additional embodiments are within the scope of this invention as claimed below.

What is claimed is:

1. A method for filtering a gas using a low-profile filter comprising; mounting a filter to a substrate block, wherein the filter comprises; a filter housing; a filter cavity defined to extend in a generally horizontal direction when the filter is in use; a first flow passage that connects an inlet at a first surface of the filter housing to a first section of the filter cavity; a second flow passage defined to connect a second section of the filter cavity to an outlet at a second surface of the filter housing on the obverse side of the filter housing from the first surface; a pass-through flow passage having a first pass-through passage opening and a second pass-through passage opening, the pass-through passage running from the first surface of the filter housing to the second surface of the filter housing and bypassing the filter cavity; a filter assembly comprising a filter disposed in the filter cavity and sealed to the surface of the filter cavity separating the filter cavity into adjacent sections including the first section of the filter cavity and a second section of the filter cavity; wherein the inlet, outlet, first pass-through passage opening and a second pass-through passage opening are configured and spaced to interface with corresponding ports on a substrate block and a single gas device; directing the gas from the inlet in the filter housing to the first section of the filter cavity; flowing the gas through the filter to the second section of the filter cavity to filter the gas; directing the gas from the second section of the filter cavity to the outlet in the filter housing.

2. The method of claim 1, wherein flowing the gas through the filter further comprises flowing the gas through a disk filter.

3. The method of claim 1, wherein flowing the gas through the first filter assembly further comprises flowing the gas through a tube filter.

4. The method of claim 3 further comprising receiving the gas from a substrate block prior to directing the gas to the first filter cavity and outputting the gas to a component mounted on top of the filter housing after filtering the gas.

5. The method of claim 3, further comprising receiving the gas from a component mounted on top of the filter housing prior to directing the gas to the first filter cavity and outputting the gas to a substrate block beneath the filter housing after filtering the gas.

6. The method of claim 3, further comprising directing the gas second generally horizontal filter cavity; flowing the gas through a second filter in the second filter cavity to filter the gas; directing the gas from the second filter cavity out of the filter housing.

7. The method of claim 6, further comprising: receiving the gas from a substrate block prior to directing the gas to the filter cavities; and outputting the gas to a component mounted on top of the filter housing after filtering the gas.

8. The method of claim 6, further comprising receiving the gas from a component mounted on top of the filter housing prior to directing the gas to the filter cavities and outputting the gas to a substrate block beneath the filter housing after filtering the gas.

9. The method of claim 3, further comprising:
receiving the gas from a substrate block prior to directing the gas to the filter cavity and outputting the gas to a component mounted on top of the filter housing after filtering the gas;
directing the gas from the component to a generally horizontal second filter cavity;
flowing the gas through a second filter in the second filter cavity to filter the gas; and
directing the gas to the outlet in the filter housing from the second filter cavity.

\* \* \* \* \*